UNITED STATES PATENT OFFICE.

SAMUEL GREEN, OF LOS ANGELES, CALIFORNIA.

IMPROVEMENT IN COMPOSITIONS OF MATTER FOR MANUFACTURING ILLUMINATING-GAS.

Specification forming part of Letters Patent No. 180,221, dated July 25, 1876; application filed May 10, 1876.

*To all whom it may concern:*

Be it known that I, SAMUEL GREEN, of Los Angeles, in the county of Los Angeles and State of California, have invented certain Improvements in Compositions of Matter for the Manufacture of Illuminating-Gas, of which the following is a specification; and I do hereby declare that in the same is contained a full, clear, and exact description of my said invention.

My invention relates to an improved compound to be used in the manufacture of illuminating-gas, and consists in combining the following ingredients, in substantially the following proportions: Twenty-five per centum of asphaltum; twenty-five per centum of sawdust, and fifty per centum of miscellaneous animal and vegetable matter. The miscellaneous matter alluded to comprises matter usually found on the banks of rivers, animal dung, bones, leather, rags, and the waste of vegetables.

The method of preparing the ingredients consists in drying the materials, mixing them thoroughly together, and forming the mixture into balls or cakes, which are introduced into suitable retorts and subjected to destructive distillation.

The gas eliminated or liberated in the distilling process is purified in the usual way before being fitted for illuminating purposes.

Where asphaltum cannot be obtained with facility and cheapness, coal-tar, or any of its products, may be used in place thereof, the result of such use being substantially the same as in the employment of asphaltum.

I claim as my invention, and wish to secure by Letters Patent of the United States—

A composition to be used in the manufacture of illuminating-gas, consisting of asphaltum, sawdust, and miscellaneous animal and vegetable matter, in the proportion substantially as herein specified.

In testimony whereof I have hereunto subscribed my name this 29th day of April, A. D. 1876.

SAMUEL GREEN.

Witnesses:
PHILIP H. JACOBS,
JOSEPH MESMER.